Sept. 14, 1926. 1,600,031
W. G. BARRATT
TEAPOT, COFFEEPOT, AND OTHER POURING VESSELS PROVIDED WITH LOOSE LIDS
Filed Dec. 17, 1925 2 Sheets-Sheet 1

Sept. 14, 1926.

W. G. BARRATT 1,600,031

TEAPOT, COFFEEPOT, AND OTHER POURING VESSELS PROVIDED WITH LOOSE LIDS

Filed Dec. 17, 1925        2 Sheets-Sheet 2

Inventor
William G. Barratt
by Herbert W. Jenner,
Attorney.

Patented Sept. 14, 1926.

1,600,031

UNITED STATES PATENT OFFICE.

WILLIAM GEORGE BARRATT, OF STOKE-ON-TRENT, ENGLAND.

TEAPOT, COFFEEPOT, AND OTHER POURING VESSELS PROVIDED WITH LOOSE LIDS.

Application filed December 17, 1925, Serial No. 76,030, and in Great Britain June 20, 1925.

My invention relates to improvements in teapots, coffee pots, and other pouring vessels provided with loose lids, the object being to construct a teapot or the like pouring vessel with means for retaining the lid or cover thereof in position when pouring of the tea or liquid is taking place.

My invention will be fully described with reference to the accompanying drawings.

In these figures $a$ is the teapot body, $b$ the spout thereof, $c$ the handle, and $d$ the lid or cover.

Figure 1:
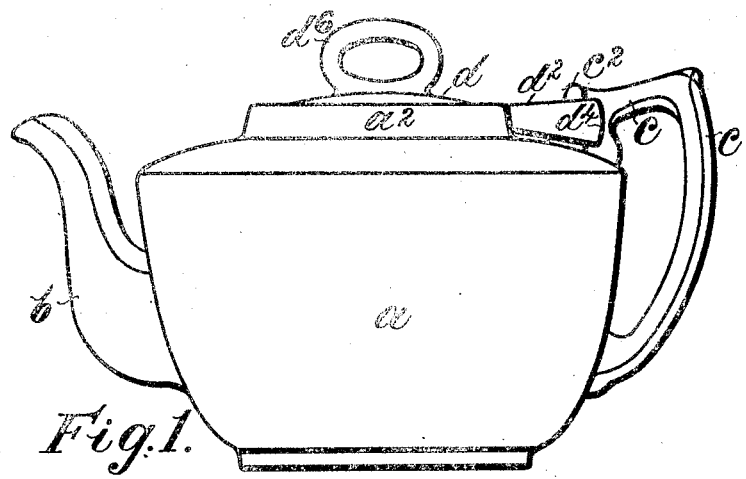
Fig. 1 is an elevation of my improved teapot.
Figure 2:
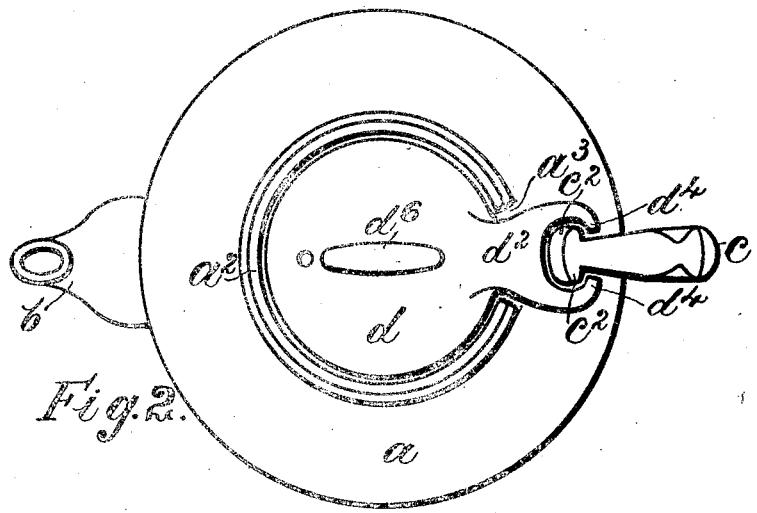
Fig. 2 is a plan of same.
Figure 6:
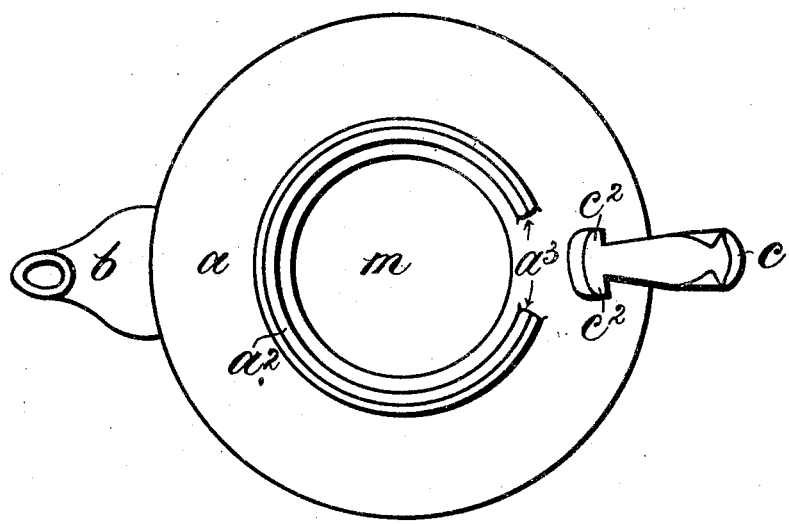
Fig. 6 is plan of Fig. 5.

The body $a$ is constructed with the usual upstanding flange $a^2$ which is discontinued at $a^3$ as shown at Figs. 2 and 6.

Figure 5:
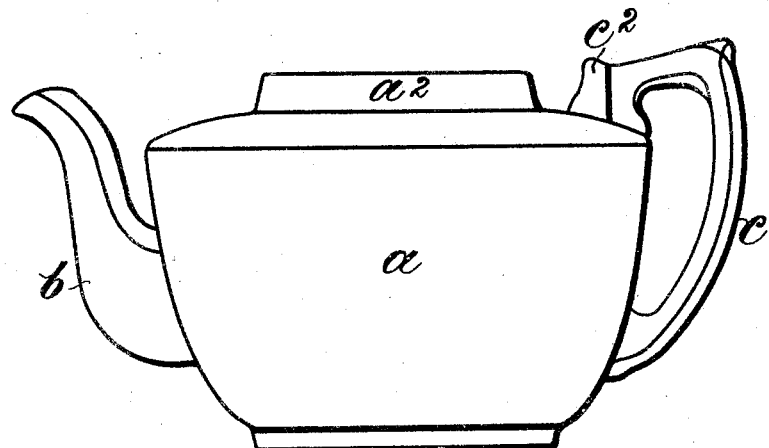
Fig. 5 is an elevation of the teapot illustrated at Fig. 1 with the lid removed.

The handle $c$ is provided at its upper end with side projections $c^2$ clearly shown at Figs. 5 and 6.

Figure 3:
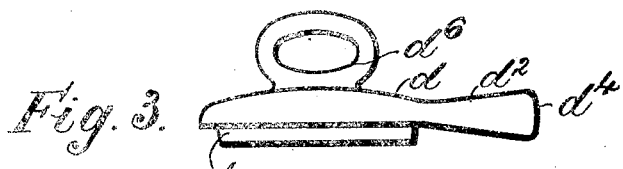
Fig. 3 is an elevation of the lid or cover.
Figure 4:
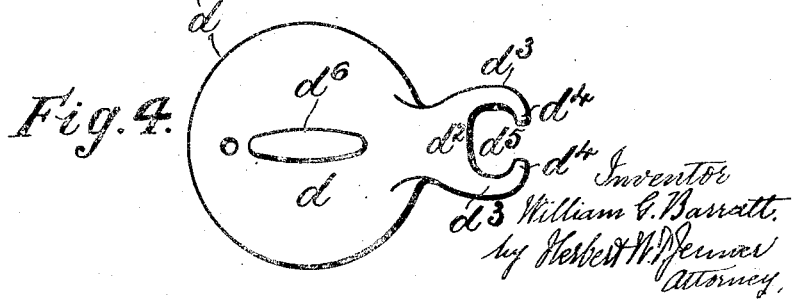
Fig. 4 is a plan of Fig. 3.

The lid or cover $d$ (see Figs. 3 and 4) is constructed with a radial extension $d^2$ to lie in the space $a^3$ of the upstanding flange $a^2$ so that it can engage the handle $c$ as will be described. The end of the said extension $d^2$ is shaped to form two side hooks $d^3$, a space or open slot $d^5$ being provided between said side hooks $d^3$ for the upper end $c^2$ of the handle $c$ to take into when the ends $d^4$ of the hooks are behind the side projections $c^2$ on the handle.

The lid or cover $d$ is placed in position in the teapot mouth $m$ (Fig. 6) by taking hold of the lid handle $d^6$, allowing the extension $d^2$ of the lid $d$ to pass into the space $a^3$ of the flange $a^2$ and the ends $d^4$ of the hooks $d^3$ to take behind the side projections $c^2$ on the handle $c$ by which means the handle is secured in position and cannot fall away during the pouring of the tea or other liquid.

The teapot, coffee pot or the like pouring vessel can be manufactured in pottery, metal, or other suitable material.

What I claim as my invention and desire to secure by Letters Patent is:—

1. A pouring vessel provided with a handle, and a removable lid having a radial extension provided with two inwardly projecting retaining hooks having a space between their tips and which loosely encircle a predetermined portion of the said handle.

2. A pouring vessel provided with a handle having lateral projections on the sides of its upper part, and a removable lid having a radial extension provided with inwardly projecting retaining hooks adapted to slip over a portion of the handle and engage with its said lateral projections.

In testimony whereof I have hereunto set my hand.

WILLIAM GEORGE BARRATT.